United States Patent [19]
Gorelick et al.

[11] Patent Number: 5,180,503
[45] Date of Patent: Jan. 19, 1993

[54] IN-SITU VAPOR STRIPPING FOR REMOVING VOLATILE ORGANIC COMPOUNDS FROM GROUNDWATER

[75] Inventors: Steven M. Gorelick, San Carlos, Calif.; Haim Gvirtzman, Modi'im Mobile Post, Israel

[73] Assignee: The Board of Trustees of the Leland Stanford Junior University, Stanford, Calif.

[21] Appl. No.: 698,409

[22] Filed: May 10, 1991

[51] Int. Cl.⁵ .............................................. C02F 1/20
[52] U.S. Cl. .................................. 210/758; 210/170; 210/765; 210/806; 210/901
[58] Field of Search ............... 210/767, 188, 170, 901, 210/758, 765, 805, 806, 205; 166/266; 203/10

[56] References Cited

U.S. PATENT DOCUMENTS

| | | | |
|---|---|---|---|
| Re. 33,102 | 10/1989 | Visser et al. | 166/267 |
| 4,593,760 | 6/1986 | Visser et al. | 166/267 |
| 4,832,122 | 5/1989 | Corey et al. | 166/266 |
| 4,886,119 | 12/1989 | Bernhardt et al. | 166/242 |
| 4,892,688 | 1/1990 | Bernhardt | 261/24 |
| 4,943,305 | 7/1990 | Bernhardt | 55/170 |

FOREIGN PATENT DOCUMENTS

| | | |
|---|---|---|
| 3805200 | 9/1988 | Fed. Rep. of Germany . |
| 3811962 | 2/1989 | Fed. Rep. of Germany ........ 203/10 |

OTHER PUBLICATIONS

"Examination of Venting for Removal of Gasoline Vapors from Contaminated Soil," prepared by Texas Research Institute, Inc., for the American Petroleum Institute, Mar. 1980 (reprinted in *Groundwater Research*, 1986).

"In-situ Remediation of Volatile Contaminants in Groundwater by a New System of Underpressure-Vaporizer-Wells", Herrling, B. et al., Proceedings of the Conference of Subsurface Contamination by Immiscible Fluids, Calgary, Apr. 1990.

*Primary Examiner*—Frank Spear
*Attorney, Agent, or Firm*—Heller, Ehrman, White & McAuliffe

[57] ABSTRACT

An in-situ system for removing volatile organic compounds (VOCs) from groundwater. The technique includes gas-lift pumping and in-situ vapor stripping.

23 Claims, 7 Drawing Sheets

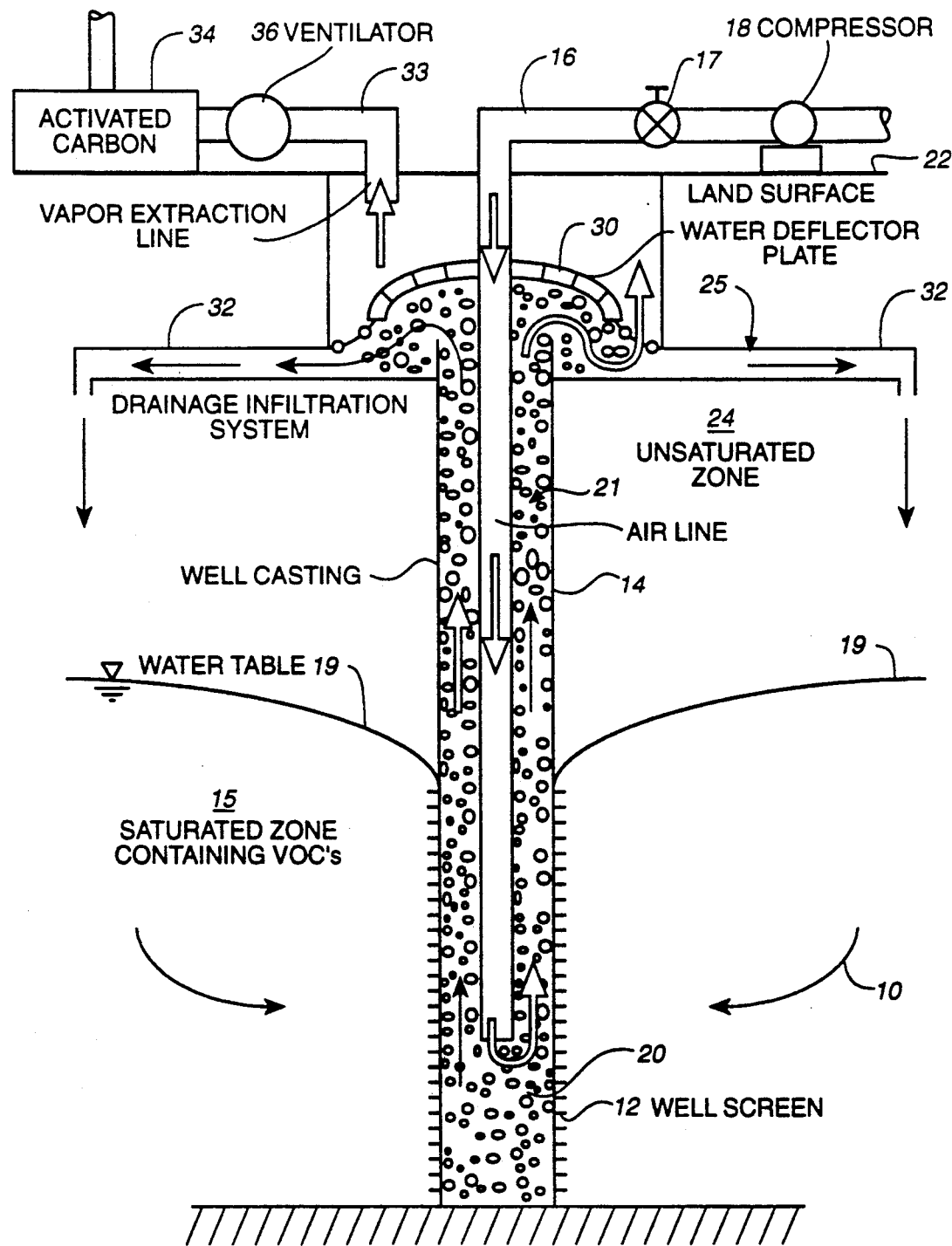
*FIG._1*

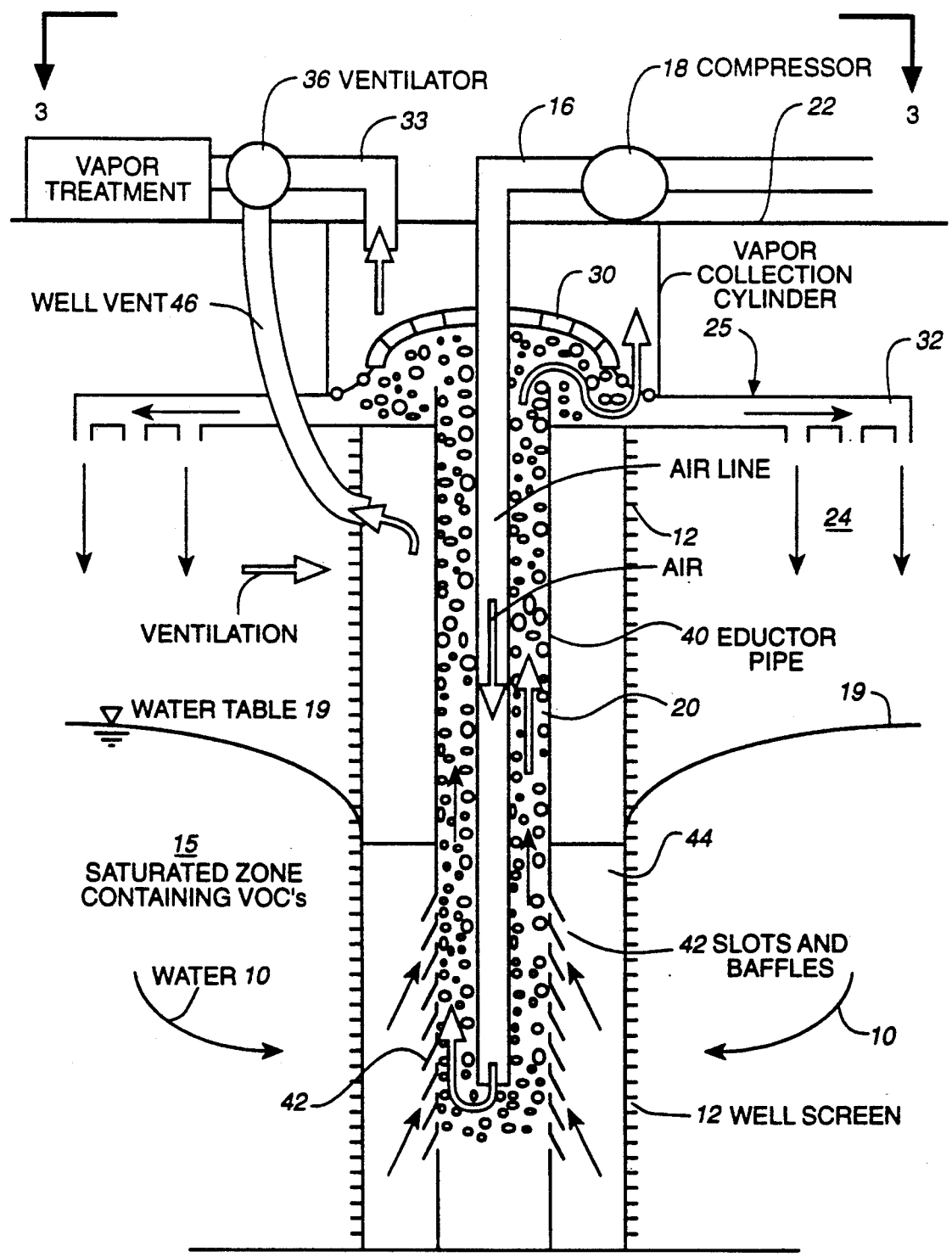
FIG._2

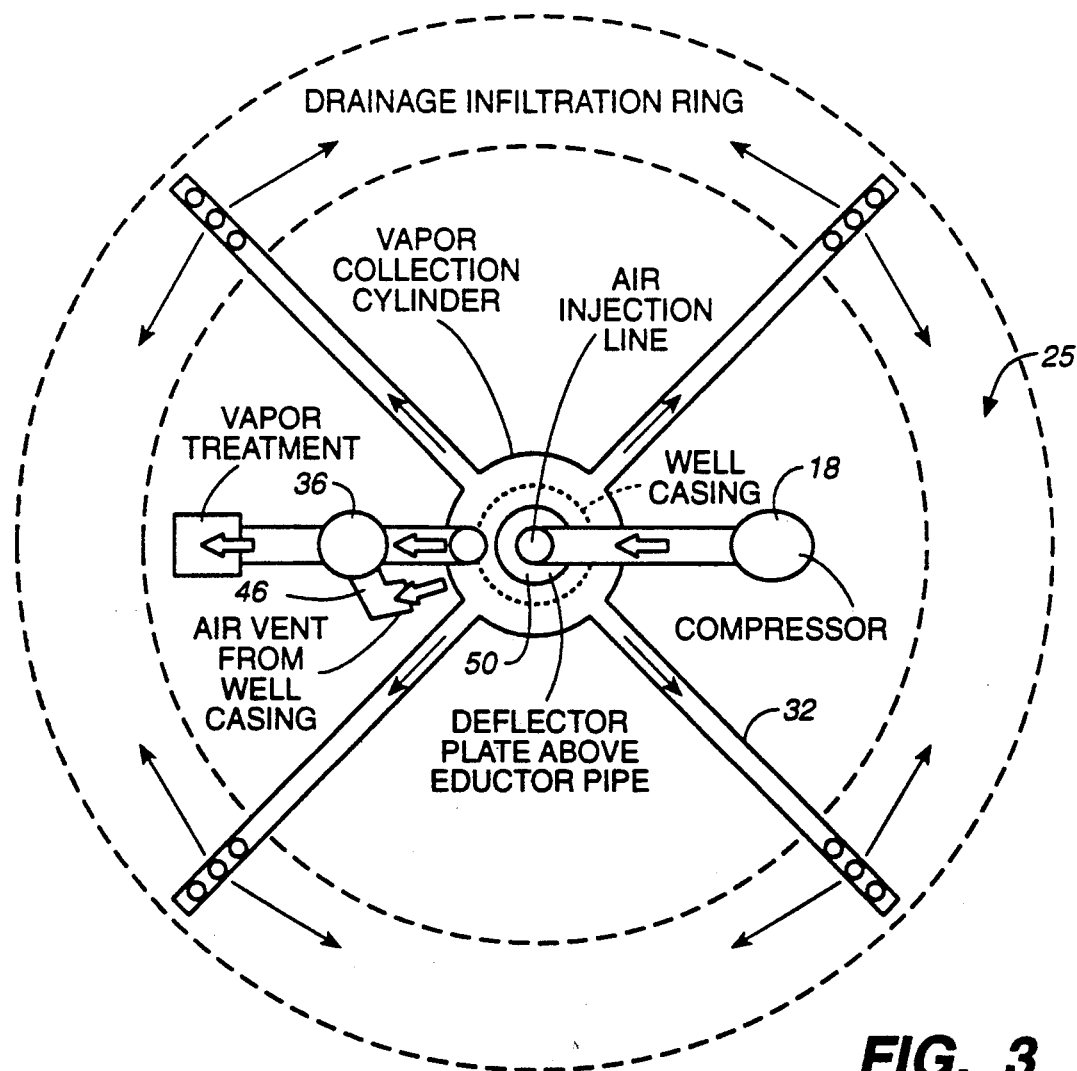
FIG._3
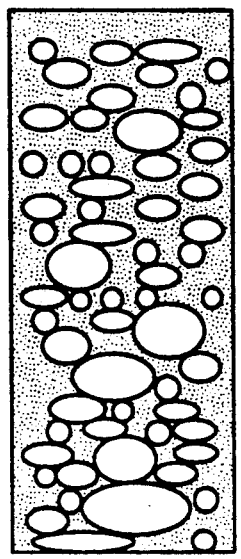
FIG._4A
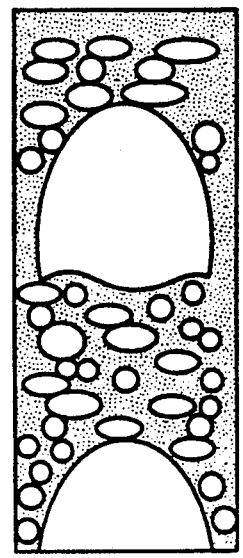
FIG._4B

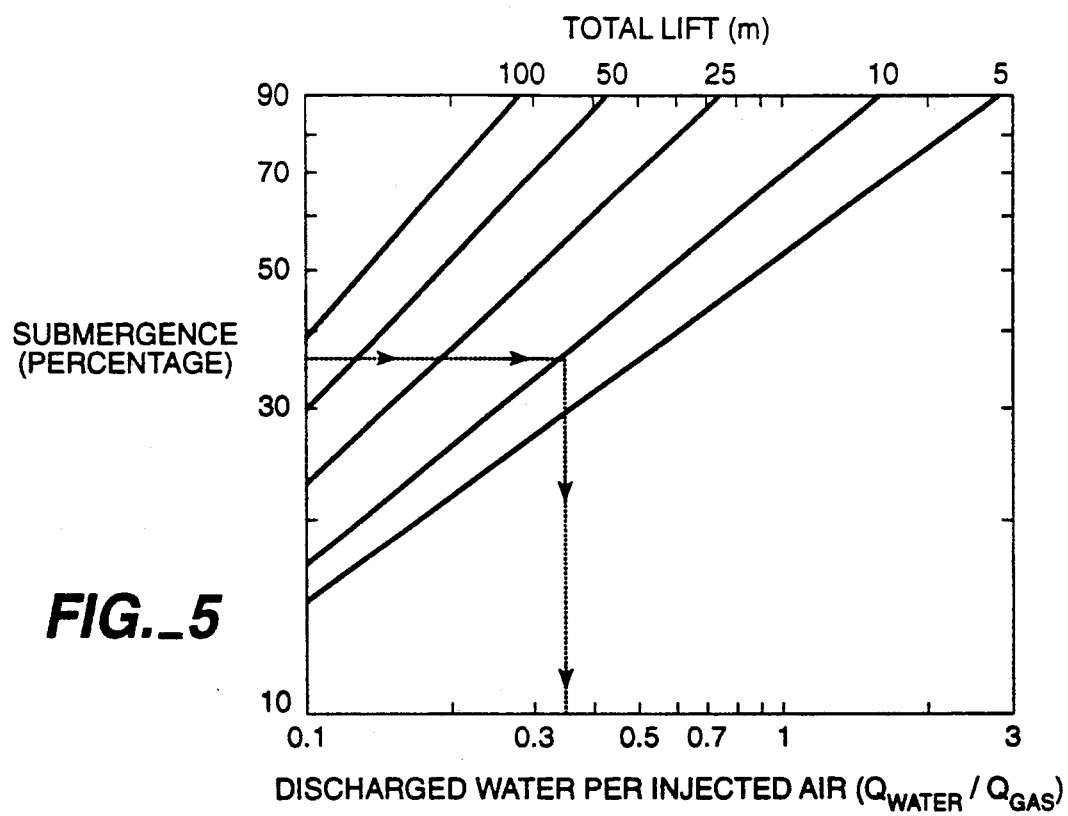
FIG._5
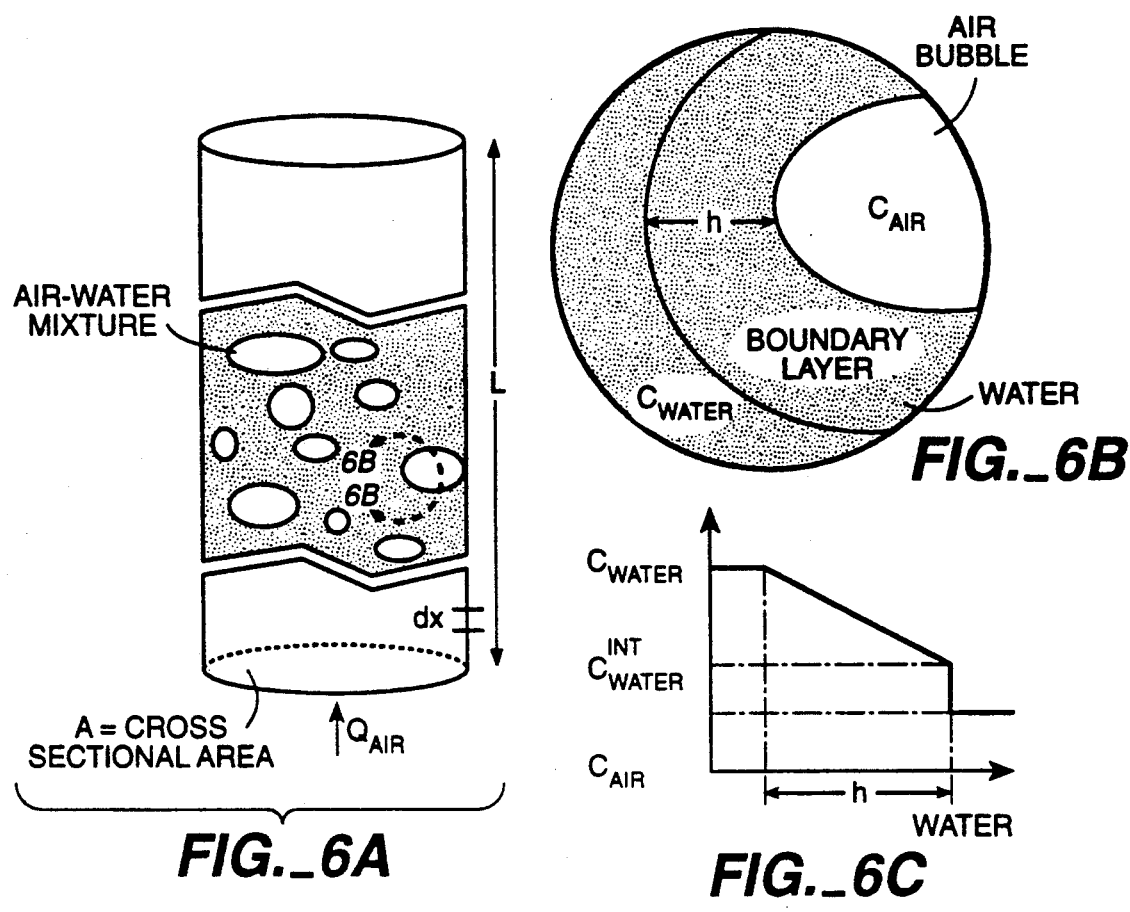
FIG._6A
FIG._6B
FIG._6C

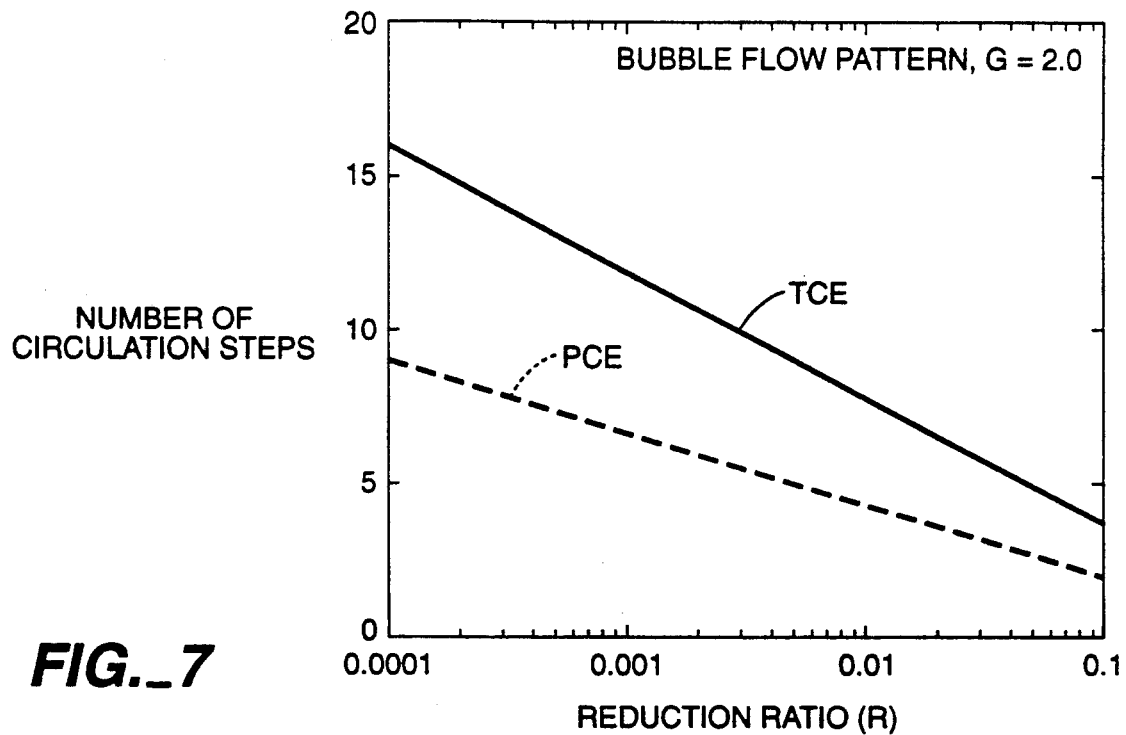
FIG._7
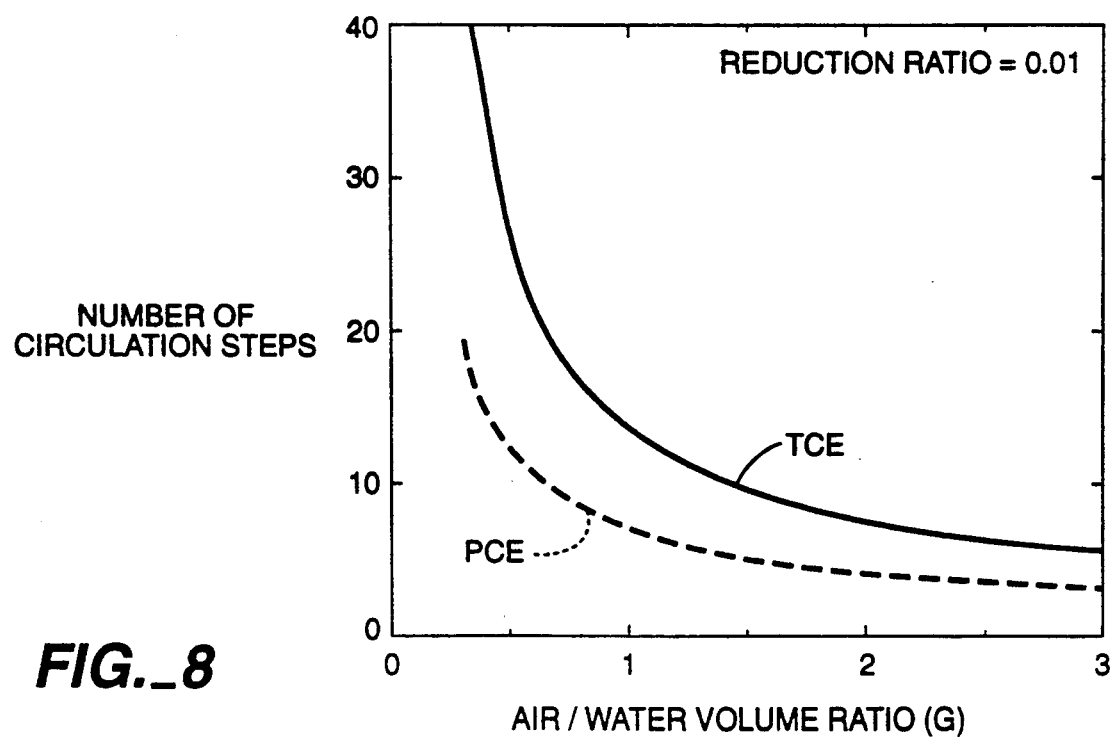
FIG._8

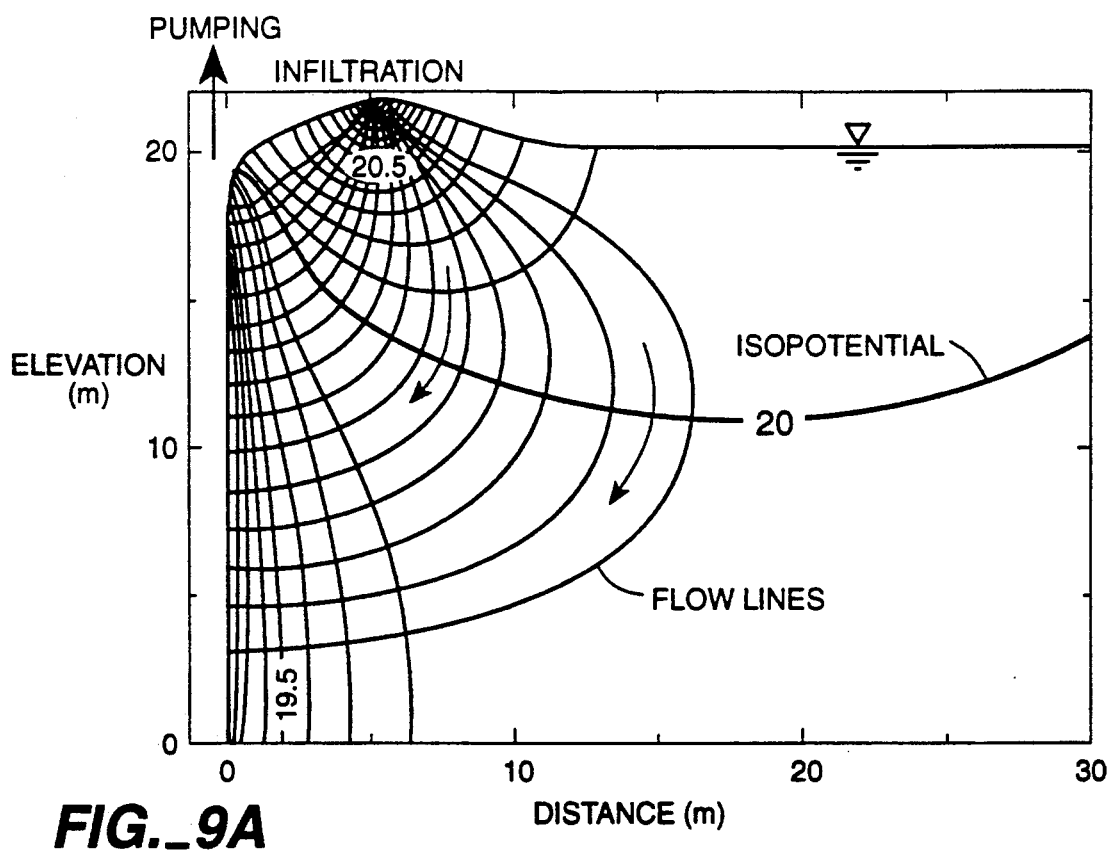
FIG._9A
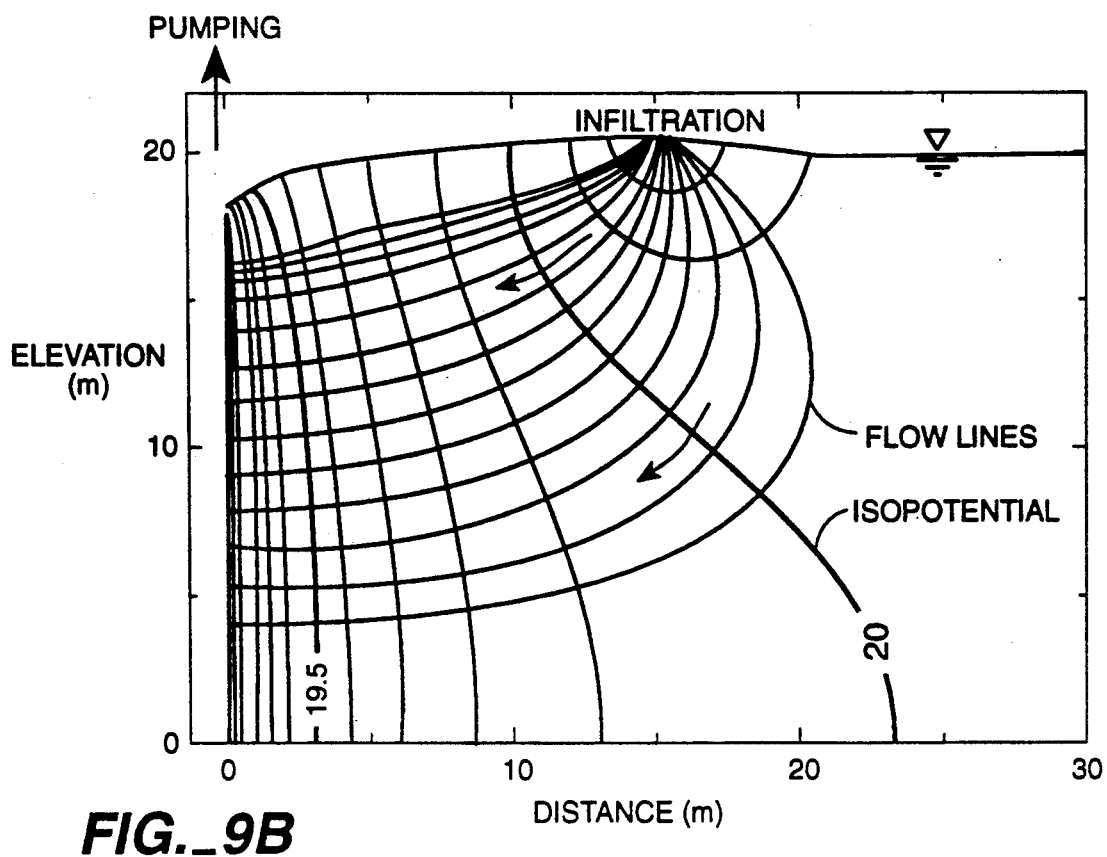
FIG._9B

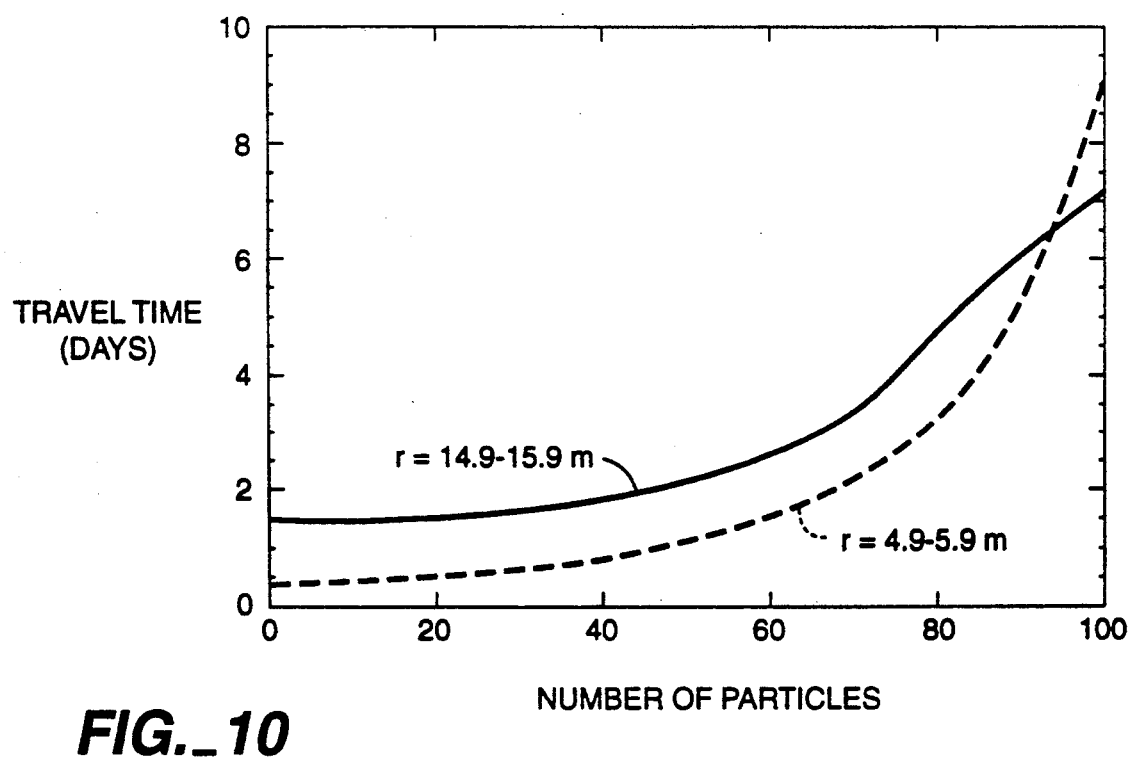
FIG._10

IN-SITU VAPOR STRIPPING FOR REMOVING VOLATILE ORGANIC COMPOUNDS FROM GROUNDWATER

BACKGROUND OF THE INVENTION

The present invention relates generally to procedures for cleaning contaminated groundwater, and more particularly to in-situ procedures for removing volatile organic compounds (VOCs) from groundwater.

During the last decade, over 1200 hazardous waste sites in the U.S. have been placed on the EPA National Priorities List for remedial investigation and cleanup. However, current remediation methods are often very expensive, and alternative concepts and techniques are needed. The present invention is particularly concerned with VOCs which pose a significant threat to groundwater supplies and are commonly detected in groundwater.

The most common class of VOC pollutants are petroleum products, such as gasoline and jet fuels. The U.S. EPA estimates that there are more than 2 million underground tanks in the United States and that 20 percent of them leak and contaminate groundwater. Such tanks leak benzene, toluene and their derivatives which become dissolved in groundwater. Another important group of VOC pollutants is chlorinated hydrocarbons, notably TCE (trichloroethylene, $CHCl=CCl_2$) and its degradation products.

One challenge for hydrologists and environmental engineers is to develop new in-situ remediation methods for removing the dissolved organic contaminants in a simple, cheap and efficient manner. At many contaminated sites, it is common for the majority of the organic pollutants to exist as separate liquid phases. A portion may dissolve into groundwater or may evaporate into the gas phase of the unsaturated zone. Once in the groundwater, the dissolved organic contaminants are transported as plumes. During aquifer remediation, the main body of organic liquid is usually removed from groundwater by skimming or pumping with subsequent above ground treatment. A portion of the liquid phase that is retained by capillary forces may continue to slowly dissolve. Remedial action may also include forced vacuum extraction through the unsaturated zone to remove the gas phase of the toxic substances. Unfortunately, the dissolved portion is not treated in-situ, because remediation technologies are limited to 'pump-and-treat' (i.e., above ground) methods.

The newly-developed method of biorestoration may provide an alternative for some specific cases. This method is aimed at enhancing biodegradation of organic compounds through the introduction or stimulation of natural microorganisms along with injection of nutrients and oxygen. Lately, methanogenic microorganisms have been discovered in natural systems that are able to co-metabolize TCE under reducing conditions after controlled stimulation. Although in the early phase of technology development, these methods may become practical and effective. However, these methods are limited to very specific conditions; for example, in-situ bioremediation of TCE-containing water is apparently limited to fluids containing less than about 100 ppm of TCE, as higher concentrations seem to be toxic. Alternatively, an in-situ remediation technique using an under-pressure vaporizer floating device was introduced.

Apparently, an in-situ aquifer remediation method that employs air lift pumping as a means of producing gas bubbles to remove VOCs from groundwater is not mentioned in the literature. Related studies have inspected the effects of air bubbles on various hydrologic, geologic, and engineering processes. The general behavior of air bubbles in groundwater is mentioned in the hydrological literature in relation to its effect on decreasing hydraulic conductivity, its effect on soil moisture hysteresis and its effect on water table fluctuations. It has been suggested that air bubbles might serve as carriers of suspended particles such as clay minerals in porous media, due to their special interface properties. In the petroleum engineering literature, the behavior of gas bubbles is mentioned by researchers regarding their effect on oil reservoirs. Transport by gas bubbles in the free liquid phase has received attention in fields as diverse as oceanography, where bubbles are mentioned as important carriers of organic matter to the sea-surface, and in flotation techniques for the processing of ores.

Air-liquid mass exchange has been applied in two different processes. First is "gas stripping" of industrial wastewater using large towers above the ground; and second, the "purge and trap" laboratory technique for analysis of concentrations of trace volatile chemicals. This water-gas phase mass transfer is very efficient. In the case of gas stripping it is possible to reduce concentrations in the aqueous phase to the water quality standards which are frequently at the detection limit. It is interesting to note that today gas stripping is used as a standard method for removing volatile chemicals from pumped groundwater in contaminated sites before its supply for domestic usage. The purge and trap method in the laboratory is also an effective removal method for many compounds.

The present invention involves a new concept for in-situ removal of dissolved VOCs from the saturated zone. It avoids standard 'pump-and-treat' methods. It is a combined gas-lift pumping technique and in-situ vapor stripping method. The idea is to inject gas into wells which lifts the contaminated water in the well. During the process, VOCs are transferred from the water to the gas bubbles. The injected gas can be air or any specific gas such as nitrogen, carbon dioxide, or any other combination of gases. The injected gas can be at the ambient temperature or it can be warm or cold. The VOCs are then collected at the top of the well by vapor extraction.

An object of the present invention is to provide a simple, inexpensive and efficient technique for removing dissolved contaminants. That is, to use the gas-lift pumping and in-situ vapor stripping techniques for removing VOCs from ground water.

Additional objects and advantages of the invention will be set forth in the description which follows, and in part will be obvious from the description, or will be learned by practice of the invention. The objects and advantages of the invention may be realized and obtained by means of the instrumentalities and combinations particularly pointed out in the claims.

SUMMARY OF THE INVENTION

The present invention is directed to a system for removing VOCs from groundwater. The system includes means for injecting gas into a well, to force groundwater flow towards the well and to cause VOCs to be transferred from the groundwater to rising gas bubbles inside the well. The system further includes means at the top of the well for collecting VOC vapor contained within the gas bubbles.

The in-situ remediation procedure of the present invention is accomplished by injection of gas into a well, using a combined technique of gas-lift pumping with a form of vapor stripping. When gas is injected into a well, it causes water to be lifted and forces groundwater flow towards the well, creating a recirculating cleanup zone. During this process, VOCs are transferred from the contaminated water to the rising gas bubbles inside the well. The gas containing VOC vapor is collected at the top of the well. In this system, water may not permitted to be lifted to the ground surface. Rather, the water is forced into the unsaturated zone through a series of drains that are installed beneath the root-zone. The water then, free of a portion of VOCs, infiltrates back to the water table. As water continues to circulate, the VOC concentrations are gradually reduced.

The feasibility of the technique of the present invention was analyzed according to concepts of mass transfer of VOCs from water to air-bubbles. Calculations indicate that the system has promise because equilibrium partitioning between the contaminated liquid and the air bubbles is rapidly established.

BRIEF DESCRIPTION OF THE DRAWINGS

The accompanying drawings, which are incorporated in and constitute a part of the specification, schematically illustrate a preferred embodiment of the invention and, together with the general description given above, and the detailed description of the preferred embodiment given below, serve to explain the principles of the invention.

FIG. 1 is a schematic structure of a well, installed with an air line and a drainage infiltration system, designated for aquifer remediation. [The remediation circulation cell will reach steady state conditions during which: water (solid arrows) is lifted in the well, forced to the unsaturated zone, infiltrates to the water table, and flows back to well. Air (dashed arrows) is injected into the well, bubbles rise and become saturated with VOCs, and are collected at the top of the well.]

FIG. 2 shows a well design to prevent air from entering the aquifer using an eductor pipe with slots and baffles. Water flow is shown by solid arrows and air flow is shown by outlined arrows. As seen, when the well is screened above the water table, the annular space between the eductor pipe and the well casing can be connected to the ventilator. This enables ventilation of vapor from the vadose zone.

FIG. 3 is a plan view along line 3—3 of FIG. 2.

FIGS. 4a and 4b show flow patterns of water-air mixture in a vertical pipe: a "Bubble flow pattern" where the air volume fraction is 67%, and a "slug flow pattern" (Containing bullet-shaped bubbles) where the air-volume fraction is 70%, respectively.

FIG. 5 shows the volume ratio of discharged water per injected air vs. the submergence percentage for different values of required total lift. This graph assumes usage of 'standard' diameters of casing and airline and serves as a useful guide for particular field cases.

FIGS. 6a, 6b and 6c show a water-air bubble mixture flowing in a pipe, demonstrating the VOC mass transfer model across the liquid boundary layer (its thickness designated by 'h').

FIG. 7 is a graph showing the required number of circulation steps vs. the reduction ratio for TCE and PCE for bubble flow pattern (G=2.0).

FIG. 8 is a graph showing the required number of circulation steps vs. the air/water volume ratio for TCE and PCE for a reduction ratio of 0.01.

FIGS. 9a and 9b are cross-sections showing the hydraulic head distribution and flow paths for radial flow systems with reinfiltration at 5 m and 15 m, respectively, from the well.

FIG. 10 shows travel times for 100 particles released 0.25 m beneath the water table for the radial flow systems with reinfiltration at distances of 5 m and 15 m from the air-injection well.

DESCRIPTION OF THE PREFERRED EMBODIMENTS

The present invention will be described in terms of a number of preferred embodiments. The preferred embodiments include an in-situ remediation procedure for removing VOCs from groundwater.

As shown in FIG. 1, this is accomplished by injection of air into a well 10, using a combined technique of air-lift pumping with a form of vapor stripping. When air is injected into a well, it causes water to be lifted and forces groundwater flow towards the well, creating a recirculating cleanup zone. During this process, VOCs are transferred from the contaminated water to the rising air bubbles inside the well. The VOC vapor is collected at the top of the well. In this system, water is not permitted to be lifted to the ground surface. Alternatively, water may be lifted above the ground surface. In either case, the water is then forced into the unsaturated zone through a series of drains that are installed beneath the root-zone. The water then, free of a portion of VOCs, infiltrates back to the water table. As water continues to circulate, the VOC concentrations are gradually reduced.

The feasibility of the proposed method was analyzed according to concepts of mass transfer of VOCs from water to air-bubbles. Calculations indicate that the method has promise because equilibrium partitioning between the contaminated liquid and the air bubbles is rapidly established. That is, after 3 m of in-well flow for a "bubble flow pattern", equilibrium occurs.

The in-situ vapor stripping method involves a combination of various technologies. As illustrated by FIG. 1, a well 10 is screened fully or partially by a well screen casing 12 in the saturated zone 15, to allow contaminated water flow into the well. The well is cased by a solid casing 14 elsewhere. Inside the well casing, an air line 16 is introduced into which air is injected by a compressor 18. As previously noted, a gas other than air may be used as appropriate. A valve 17 controls the air flow in line 16. The rate of air injection can be adjusted to create substantial groundwater circulation toward the well and to control the rate of in-situ volatilization of VOCs. Mass exchange rates are approximated for VOC movement between the liquid and gas phases.

The air in air line 16 is released beneath the water table 19, creating bubbles that rise. Due to the density difference between the water column outside the well and the water-bubble mixture column 20 inside the well, a lift is created. In other words, water rises up the well and water inside the aquifer flows towards the well. The water and air-bubble mixture 20 flows upward in the annular space 21 around the air line. In this system, water is not permitted to be lifted to the ground surface 22, thereby reducing costs and protecting the biotic environment above the root zone. Rather, the water is forced into the unsaturated zone 24 through a series of drains, represented generally by reference numeral 25, that are installed beneath the ground/land surface 22 in the unsaturated zone. These drains emanate horizontally from the well and their purpose is to return the air-lifted water to the aquifer by allowing the water to infiltrate through the unsaturated zone 24 (see also FIG. 3). In this way, a water circulation cell is created in the vicinity of the well. The drains, as discussed in more detail below, may comprise a series of buried pipes 32.

Simultaneously, an air-stripping 'chamber' is created within the well-casing. During the period in which the air bubbles flow through the water in the well, VOCs are transferred from the water to the gas phase. The effectiveness of vapor stripping will be based on the concentration gradient, the time span available for mass exchange, and the interface area of the air bubbles. The VOC vapor is collected using a vapor extraction technique at the top of the well. To enable collection of VOC vapor in the well, the air must be separated from the water. This can be accomplished using a simple deflection plate 30 (FIG. 1) that enables the bubbles to be released and the vapor containing VOC's to be collected through the vapor extraction line 33. The means used to separate the gas from the water can be accomplished, for example, using various designs of deflector plates, stacked porous plates, or a gravel pack. The organic rich vapor is run through activated carbon 34 for removal, and a ventilator 36 is connected across line 33 to allow for vapor extraction. The removal of VOC vapor can be accomplished through a variety of processes including adsorption, biological treatment, chemical treatment, incineration, or atmospheric venting and dilution.

An air-venting 'chamber' is created in the unsaturated zone 24 while water infiltrates back to the water table. During this stage, the VOCs continue to be released into the soil gas. Soil gas venting can be used to remove the VOCs from the unsaturated zone. Because the pumped water drains continuously to the water table, the unsaturated zone can be used as a natural "vapor stripping tower". As this process continues, water circulates from the aquifer to the well and then back to the water table. The concentration of VOCs is reduced, and after a sufficient number of circulation cycles, they will reach the permitted concentration standards.

For cases in which there is concern that air injection will force bubbles into the aquifer, a modified design is possible as shown in FIG. 2. An eductor pipe 40 can be installed between the air-line 16 and the well casing 12, creating a well-within-a-well. Then air injected into the air-line would be contained within this "inner well". Water and air would rise towards the ground surface 22 within the eductor pipe, forcing additional water to flow from the aquifer into the eductor pipe. Furthermore, the eductor pipe may be slotted and baffled at the lower end thereof, as represented by slots and baffles 42, to prevent gas bubbles from escaping horizontally. With this modification, it is nearly impossible for air bubbles to enter the aquifer because the bubbles are fully contained within the eductor pipe.

Furthermore, the well casing 12 can be screened, as shown, or partially screened in the vadose zone 24. The annular space 44 between the well casing and the eductor pipe can be vented through a well-vent tube 46. This enables vapor containing VOC's in the vadose zone to be extracted and treated through the same vapor treatment system that is used to treat the VOC's removed from groundwater. A plan view of this system is shown in FIG. 3.

The vertical flow pattern of gas-liquid mixtures is a function of both the air and water velocities in the pipe. Two flow patterns, bubble and slug, which occur at successively higher air rates, are relevant to the present method, and are shown in FIGS. 4a and 4b. At a low air velocity, the gas is dispersed as discrete bubbles some of which may increase in size by coalescence. When bubbles are generated continuously, a pseudo-equilibrium condition is achieved where the size, shape and number per unit volume become relatively stable and are no longer affected by coalescence. This is the "bubble pattern" flow of FIG. 4a. With an increase in gas flow, some of the bubbles coalesce to form larger cap-shaped bubbles nearly spanning the tube. This marks the beginning of the "slug pattern" flow of FIG. 4b. The transition from a bubble (FIG. 4a) to a slug flow pattern (FIG. 4b) usually occurs when the volume fraction of the gas phase is between 0.25–0.70, and depends on the velocities of both phases. As the air rate is further increased, these bubbles become larger and each assume a bullet shape. The slug flow pattern is characterized by bullet-shaped bubbles surrounded by a thin water annulus alternating with slugs of water containing small bubbles. A further increase in air rate, beyond that of interest here, will create a continuous air phase.

The variation in bubble radius during its life is controlled by the competition between the tendency to increase due to constantly reducing hydrostatic pressure while ascending, and the tendency to decrease due to dissolution of the air in the water. For small bubbles, the variations in the bubble radii are controlled by the gas dissolution into liquid, and thus they tend to dissolve and disappear. In contrast, large bubbles tend to grow. The limiting bubble radius separating these two opposite possibilities is a function of the water depth. It is about 100 $\mu$m for a 10 m depth and about 300 $\mu$m for a depth of 100 m.

When a single bubble is released from an orifice in a stagnant liquid, a distance of only a few bubble radii is needed to reach a constant velocity. The terminal velocity occurs when buoyancy forces are balanced by viscous forces. The ascent velocity of a single bubble in a free and stationary liquid phase is a function of the bubble radius and the water viscosity, and cannot exceed 30 cm/sec.

Obviously, adjacent bubbles influence each other. Below a certain minimum separation distance, oscillation, spiraling and random motion could cause collision, adherence or coalescent. Furthermore, the vortex disturbance created by a rising bubble slows the rise of the trailing bubble. In fact, it was found that the velocity of a continuous swarm of bubbles in a stagnant liquid is significantly less than that of a single bubble.

When a swarm of bubbles rises with a vertically or inclined flowing stream of water, the mutual influence of the two flowing phases has to be considered. During vertical flow of a liquid-gas mixture in a pipe there is a "holdup" effect, also known as the "slip" effect. That is, the gas tends to flow at a higher average velocity than does the liquid. It has been found that the absolute rise velocity of bubbles in rising water will be a simple vector sum of the bubble velocity in a stagnant liquid and the local absolute velocity of the flowing liquid. There are some difficulties in applying the vector-sum concept to determine the average absolute rise velocity of bubbles in a flowing liquid because of nonuniformities in velocities, the variability in bubble concentration, and the liquid velocity distributions across the pipe. For present purposes, the difficulty in calculating the water and air velocity arises from the unstable flow pattern of the liquid-gas mixture, and the complex phase geometry inside the annular space. Consequently, air and water ascent velocities must be predicted based on empirical relations.

The technique of pumping groundwater by injecting air into a well is an accepted method of well development. It is also used as a method for petroleum extraction. The method is well understood in theory and practice for the purpose of water well development and petroleum recovery, but has not been used as a combined pumping and vapor-stripping method to remove VOCs in-situ as in the present invention.

Given an initial static water level, the compressor 18 used for air injection must overcome the initial water head dictated by the submergence depth of the air line 16 (FIG. 1). This head is called the starting submergence. When injection of air starts, the water column becomes partly aerated, causing water in the well to rise, followed by drawdown in the aquifer due to flow into the well. Given sufficient time, a steady state condition will be developed with a constant flow rate and a steady drawdown. This defines the final pumping submergence depth and the total pumping lift.

For practical purposes, empirical rules have been established to determine the air volume required to pump (or air-lift) a certain volume of water. It depends on the total lift, the submergence of the air line below the water table, and the annular area. Water discharge versus percent submergence can be calculated if the air injection is known (see FIG. 5). For example, when it is desired to lift the water 10.0 m above the water table under a steady state flow condition, and the pumping submergence depth is 5.0 m, i.e., 33% of 15.0 m, then for every liter of injected air, 0.33 liter of water will be pumped (FIG. 5).

Because of the complexity of the water-bubble system, VOC mass exchange rates can only be approximated. Present estimates are based on much simpler geometries than can be obtained in reality, but calculations indicate that the method has promise because equilibrium partitioning between the contaminated liquid and the air bubbles is rapidly established. The mechanism by which the dissolved VOCs are transferred between aqueous and gaseous phases is described by a mass flux in the presence of a concentration gradient. Two possibilities have to be distinguished: equilibrium and non-equilibrium conditions. The question addressed here is: How rapidly do the rising bubbles become saturated with VOC vapor?

The distribution of volatile compounds between air and water is often expressed by Henry's law, which is a linear relationship between the equilibrium concentration of a volatile compound in the aqueous and gaseous phases. Henry's law for a system at equilibrium, based on the "ideal gas" law, is:

$$H = \frac{C_{air}}{C_{water}} = \frac{16.04 P_v M}{TS} \quad (1)$$

where H is the dimensionless Henry's coefficient, $C_{air}$ and $C_{water}$ are the mass concentrations of VOCs in the air and water phases (g/m³), respectively, $P_v$ is the vapor pressure (mm Hg) measured above the pure liquid organic phase, M is the molecular weight of the solute (g/mole), T is the temperature (° K.), and S is the equilibrium solubility of the solute in the water (g/m³).

A first-order expression can be adopted where the force driving mass transfer is proportional to the departure from equilibrium. The proportionality constant is an overall mass transfer coefficient reflecting the contribution of geometry and the complicated structure of the interface between phases. Applying the first-order mass exchange concept to the rates of change in concentration of VOCs in the liquid and gas phases, yields:

$$-v_{water} \frac{dC_{water}}{dt} = v_{air} \frac{dC_{air}}{dt} = v_{air} K_p \left( C_{water} - \frac{C_{air}}{H} \right) \quad (2)$$

where $v_{air}$ and $v_{water}$ are the volume fractions of air and water in porous media, $K_P$ is the overall mass transfer coefficient for gas-liquid partitioning (1/sec), and t is time (sec).

The effectiveness of VOC removal in the remediation process of the present invention can be roughly estimated by applying chemical engineering analysis. For example, consider a pipe containing water and air bubbles flowing vertically in which dissolved VOCs are transferred at the water-gas interface. Such a system is illustrated in FIG. 6. For volatile substances, the mass transfer from the liquid to the gas phases is "liquid-phase-controlled". Consequently, a thin water film (boundary layer) is assumed to exist next to the air-water interface, across which a concentration gradient of VOCs is developed.

Assuming local chemical equilibrium across the water-gas interface, the VOC concentration on the liquid side of the interface is $$C_{water}^{int} = \frac{C_{air}}{H}$$

where $C_{air}$ is the VOC concentration in the gas bubble (which is assumed to be well mixed). While flowing in the pipe, the concentration of the VOCs, $C_{air}$, in the bubble increases. Based on a first-order mass transfer rate relationship, during flow along a length of pipe, the change in vapor concentration in the bubble is:

$$\frac{dC_{air}}{dx} = \frac{K_L a_b A}{Q_{air}} (C_{water} - C_{water}^{int}) = \frac{K_L a_b}{U_o} \left( C_{water} - \frac{C_{air}}{H} \right) \quad (3)$$

where:
$C_{water}^{int}$ is the mass concentration of VOCs in the water at the interface (g/m³),
$K_L$ is the liquid mass transfer coefficient (m/sec),
$a_b$ is the bubble surface area per unit volume of mixture (m²m³),
A is the cross-sectional area of the pipe (m²),
$Q_{air}$ is the volumetric gas flow rate (m³/sec),
x is the length (m), and $U_O = (Q_{air}/A)$ is the surficial air velocity (m/sec).

Equation (3) assumes that the mass transfer of the dissolved VOCs is sufficiently small, so that $Q_{air}$ is nearly constant, which is quite reasonable. It is noteworthy that $K_L$ is affected by the bubble diameter.

Air entering the bottom of the pipe (FIG. 6) is free of VOCs, so $C_{air}(x=0)=0$; thus, the solution to Equation (3) is:

$$C_{air}(x) = HC^*_{water}\left[1 - \exp\left(\frac{K_L a_b}{HU_o}\right)x\right] \quad (4)$$

This solution assumes that during its life time, a bubble is in contact with water containing a constant concentration of VOC that is achieved at the top of the well, $C^*_{water}$. This approximation yields a conservative estimate (underestimate) of the mass exchange rate.

The key question is, what is the travel distance, $x_{sat}$, required to achieve vapor saturation (i.e., equilibrium conditions)? It can be seen from Equation (4) that the critical unknown parameter which controls the rate of vapor equilibration is $K_L$, the mass transfer coefficient. It can be estimated using a semi-empirical approach employed in chemical engineering. The mass transfer coefficient is incorporated in the dimensionless Sherwood number, Sh:

$$Sh = \frac{K_L d_b}{D_L} \quad (5)$$

where: $d_b$ is the average bubble diameter (m), and $D_L$ is the diffusivity of the dissolved VOC in water (m²/sec). The Sherwood number can be calculated by considering the contributions of flow conditions and molecular diffusion. The Sherwood number has been developed for different systems in chemical and biochemical engineering. The industrial air-sparged reactors, in which bubbles are produced in swarms, are most relevant to the present system. For air-lift operations where large bubbles change their shape while rising, the following correlation has been, verified:

$$SH = 0.5 Gr^{\frac{1}{3}} Sc^{\frac{1}{2}} \quad (6)$$

where Gr and Sc are the dimensionless Grashof and Schmidt numbers, characterizing flow conditions and molecular diffusion, respectively, and are:

$$Gr = \frac{d_b^3 \rho_w (\rho_w - \rho_a)}{\mu_w^2} \equiv \frac{d_b^3}{v^2} \quad (7a)$$

$$Sc = \frac{V}{D_L} \quad (7b)$$

where $\rho_w$ and $\rho_a$ are the water and air mass densities (g/m³), respectively, $\mu_w$ is the water viscosity (g/m/sec), and $v=(\mu_w/\rho_w)$ is the water kinematic viscosity (m²/sec). The Grashof number is the characteristic dimensionless value that describes the flow conditions (similar to the Reynolds number) for situations where the density difference (buoyancy) provides the major driving force for fluid motion.

Equations (6) and (7) were used to estimate $K_L$ in this in-situ vapor stripping system. The change in vapor saturation that occurs while water and air bubbles rise in the well was calculated for a variety of flow conditions. Consider two of the cases of bubble and slug flow patterns which correspond to FIGS. 4a, b. The first case involves an average bubble size of 0.64 cm. The second case involves two different types of coexisting bubbles. For that case, calculations of vapor saturation were done separately for the small bubbles in slugs of water and for the elongated bullet-shaped bubbles. The calculations below show that for water containing TCE, the vapor becomes saturated after flowing only several meters for both cases. Using Equations (4) and (6) and the values in Table 1 (below), it can be concluded that in most cases, when dealing with contaminated sites where the well casing is more than 10 meters long, the rising air bubbles can be considered as chemically saturated with TCE vapor.

For cases in which vapor saturation is not rapidly achieved the rise of bubbles may be slowed artificially. This can be done by creating a series of obstacles within the eductor pipe with the possible inclination of the well and eductor installation.

TABLE 1

TCE mass transfer calculations for bubble and slug flow patterns in a pipe:

| Parameter | Symbol | Bubble flow[1] | Slug flow[2] Small | Slug flow[2] Large | Units |
|---|---|---|---|---|---|
| Air/water volume ratio | G | 2.0 | 2.3 | | — |
| Air volume fraction | | 0.67 | 0.70 | | — |
| Water kinematic viscosity | V | $10^{-6}$ | $10^{-6}$ | | m²/sec |
| TCE diffusivity in water | $D_L$ | $9.5 \times 10^{-10}$ | $9.5 \times 10^{-10}$ | | m²/sec |
| Schmidt number | Sc | 1050 | 1050 | | — |
| Average bubble diameter | $d_b$ | $6.4 \times 10^{-3}$ | $6.4 \times 10^{-3}$ | $2.3 \times 10^{-2}$ | m |
| Grashof number | Gr | $2.6 \times 10^5$ | $2.6 \times 10^5$ | $1.2 \times 10^7$ | — |
| Sherwood number | Sh | 1000 | 1000 | 3700 | — |
| Mass transfer coefficient | $K_L$ | $1.5 \times 10^{-4}$ | $1.5 \times 10^{-4}$ | $1.5 \times 10^{-4}$ | m/sec |
| Specific interfacial area | $a_b$ | 630 | 430 | 140 | m²/m³ |
| Superficial air velocity | $U_o$ | 0.15 | 0.31 | | m/sec |
| TCE Henry's Const. | H | 0.4 | 0.4 | | — |
| Fractional saturation[3] (3 m well) | S(x = 3) | 0.99 | 0.79 | 0.40 | — |
| Fractional saturation[3] (6 m well) | S(x = 6) | 1.00 | 0.96 | 0.64 | — |
| Fractional saturation[3] (9 m well) | S(x = 9) | 1.00 | 0.99 | 0.78 | — |

[1]Corresponds to FIG. 3a.
[2]Slug flow consists of two bubble types and corresponds to FIG. 3b: small bubbles inside the liquid slug and large bullet-shaped bubbles between liquid slugs.
[3]Fractional saturation is defined by:

$$S(x) = \frac{C_{air}(x)}{HC^*_{water}} = 1 - \exp\left[-\left(\frac{K_L a_b}{U_o H}\right)x\right]$$

To determine the efficiency of the present in-situ vapor stripping method, it is necessary to calculate the time-span required to reach the Maximum Permitted Concentration (MPC) for a particular VOC in groundwater. Start by assuming that liquid-vapor transfer occurs only inside the well, and then determine the number of pore volumes that must be circulated to reduce the VOC concentration in the water to the MPC.

A single step of the remediation process is defined as the time it takes for all water in one saturated pore volume within the "influence zone" to enter that well. This influence zone can easily extend 20 m radially from the well. During this time the contaminated water equilibrates with the air bubbles inside the well. Initially, it was assumed that the contaminant does not sorb (this assumption will be relaxed later). Under steady-state flow conditions, the ratio between the water and air volumes inside the well is constant. The VOC mass balance between water and air during the n-th step is:

$$(C_{air}^n - C_{air}^{n-1})U_{air} = (C_{water}^{n-1} - C_{water}^n)U_{water} \quad (8)$$

where C is concentration and U is volume in the well. Assuming the air injected into the well is always free of VOCs, $C_{air}^{n-1} = 0$, and assuming a constant ratio of air to water volume, $G = U_{air}/U_{water}$, then:

$$C_{water}^n = C_{water}^{n-1} - GC_{air}^n \quad (9)$$

Given chemical equilibrium, Henry's Law may be used, $C_{air}^n = HC_{water}^n$. Then:

$$C_{water}^n = \left(\frac{1}{1 + GH}\right) C_{water}^{n-1} \quad (10)$$

The VOC concentration in groundwater at the end of the p-th step can be defined as a function of the initial VOC concentration in groundwater based on a recursive series:

$$C_{water}^p = \left(\frac{1}{1 + GH}\right)^p C_{water}^0 \quad (11)$$

where p is the number of steps after initiation of circulation. Defining R as the reduction ratio, such that $$R = \frac{C_{water}^{final}}{C_{water}^{initial}} = \frac{C_{water}^p}{C_{water}^0},$$

then the number of steps needed to reduce the initial concentration to the desired one can be derived by taking the log of both sides of equation (11) and rearranging, or:

$$p = \frac{-\log R}{\log(1 + GH)} \quad (12)$$

The following examples illustrate the possible effectiveness of the in-situ vapor stripping method of the present invention. Consider a case where the groundwater temperature is 20° C. and one must reduce the concentration of TCE (H=0.4) and PCE (H=0.9) from 100 ppm to 1 ppm (R=0.01). Here we will assume that VOC concentrations are reduced only inside the well. FIGS. 7 and 8 summarize the results.

The number of circulation steps needed to reduce the concentrations of TCE and PCE dissolved in the groundwater for an in-well air/water volume ratio, G, of 2.0, is shown in FIG. 7. This represents the speed of cleanup. This ratio is representative of a "bubble flow pattern" (FIG. 4a and Table 1). The most important result is that a reduction in concentration by 2 orders of magnitude (R=0.01) will occur in about 10 flow cycles for TCE and 5 for PCE. FIG. 8 shows the number of circulation steps needed to reduce the concentration of these compounds by two orders of magnitude (R=0.01) under various air to water volume ratios in the well. Under equilibrium conditions larger G values correspond to the removal of a greater mass of VOCs than do smaller G values. This fact accounts for the reduced number of circulations steps corresponding to large G values. It can be seen that even for very low air injection rates (G=1), the number of circulation steps is less than 15 for TCE and less than 10 for PCE.

As discussed, the conceptual flow circulation system involves a central well 10 surrounded by an infiltration gallery. This gallery, called the drainage infiltration system 25 (FIGS. 1-3), consists of a series of buried pipes 32 emanating from the well to a manifold. At the end of each pipe the water is permitted to infiltrate back to the water table 19 through a narrow infiltration zone. To estimate the likely groundwater circulation pattern that the air-lift and reinfiltration system would produce, some simple simulations and particle travel time analyses have been conducted. The infiltration gallery has been approximated as a donut shaped ring around the well. That is, the infiltration gallery consists of a number of buried pipes which feed into a slotted circular ring. In some cases it may not be necessary to bury the pipes emanating from the well. The water rises up the well, flows away in the buried pipes and then reinfiltrates in a one meter wide ring surrounding the well (see FIGS. 1-3). The distance from the central well to the beginning of the infiltration zone was fixed at 4.9 meters in one simulation and 14.9 meters in another so that the influence of infiltration location on the flow circulation pattern could be seen.

Simulations were conducted assuming radial flow conditions for an isotropic homogeneous aquifer. The simulation of this system is based on the radial flow equation for steady-state conditions;

$$\frac{\partial}{\partial r}\left(2\pi rK\frac{\partial h}{\partial r}\right) + \frac{\partial}{\partial z}\left(2\pi rK\frac{\partial h}{\partial z}\right) + Q_{water}^* = 0 \quad (13)$$

where:
h is the hydraulic head h(r,z), (m);
K is the hydraulic conductivity, (m/sec);
r is the radial distance from the well, (m);
z is the vertical coordinate, (m);
$Q_{water}^*$ is the pumping rate (m/sec); and
$\pi$ is 3.1416.

Equation (13) was solved using the finite difference model MODFLOW, and the particle velocities were determined using the tracking routine. The relevant parameters for the simulation model are hydraulic conductivity of $10^{-5}$ m/sec effective porosity of 0.2, pumping rate of 0.375 liters/sec., and a well radius of 0.1 m. The hydraulic head distributions in cross-section for the radial flow system given reinfiltration at two different distances away from the well are shown in FIG. 9. Also shown are the flow paths corresponding to each reinfiltration system. In both cases most of the flow recirculates within 20 meters of the well.

Under steady state conditions, the time of transport through the unsaturated zone 24 will be directly related to the thickness of the unsaturated zone and to the flux of water coming from the well. Assuming a 10-m thick unsaturated zone beneath the drainage infiltration system and a pumping rate of 0.375 liters/sec., it may take about 10.5 and 30.0 days for the water to infiltrate to the water table, for infiltration distances of 5 and 15 m from the well, respectively.

The travel times were computed for 100 particles released 0.25 m beneath the water table and released at distances from the well of 4.9-5.9 m (FIG. 9a) and 14.9-15.9 (FIG. 9b). The travel time is defined as the time taken for a particle to move back to the well through advection only. Travel time plots for the two release distances are shown in FIG. 10. For either infiltration distance, 95% of the particles return to the well within 7 days and most particles have a travel time of about 1 or 2 days. A single flow circulation will sweep a ring having a diameter of 40 meters around the central wall. The cylindrical space round the well that contains the water-flow paths is defined as the "influence zone" of the well during the remediation process.

The above calculation ignores the effects of sorption. However, this effect can be approximated assuming equilibrium liquid-solid partitioning. Halogenated hydrocarbons commonly are retarded by factors ranging from 2 to 9 depending upon the composition of the porous media and the specific compound. If we take a value of 3 for the retardation factor of PCE, then the travel times of individual particles shown in FIG. 10 must be multiplied by 3. In such a case a single flow circulation would take about 21 days in the saturated zone.

The infiltration system can be configured in a variety of geometries. For example: the reinfiltration zone can be on one side of the well only. Furthermore, the single well system analyzed here can be a component in a larger system consisting of many wells connected to a complex reinfiltration network.

In addition to the mass transfer that occurs in the well, VOCs will also be released during infiltration through the unsaturated zone while the pumped water is returned to the water table. The VOCs that are released there can be removed by venting the soil. The combination of the in-well mass transfer and venting of the vadose zone will give the total rate of VOC removal using this system.

In summary, a method aimed at removing VOCs dissolved in groundwater has been disclosed. The idea is to drive the VOCs from the dissolved phase into the gas phase by gas injection into a well using combined gas-lift pumping with a form of in-situ gas-stripping. The lifted water, free of a portion of VOCs, infiltrates through the vadose zone back to the water table. As water circulates through the in-situ treatment system, the VOC concentrations are gradually reduced. The VOCs that are released into the gaseous phase in both the well and the vadose zone can be removed at the top of the well and through forced air ventilation. This technique is very simple and would avoid pump-and-treat restoration. It would reduce above-ground treatment. Using this system, it is not necessary to bring the contaminated water to the ground surface.

The feasibility of this method was shown through mass transfer calculations and flow simulations. Mass-transfer calculations considered equilibrium and non-equilibrium effects. Calculations indicate it is likely that vapor saturation occurs within air bubbles when they reach the top of the well. The flow simulations assume a homogeneous and isotropic medium, without sources and sinks (e.g., entrapped NAPL ganglia and unequilibrated soil adsorption, respectively.) In field cases more complex factors have to be considered.

Modifications of the proposed system can improve its efficiency. For example, problems of oxidation, chemical precipitation and biofouling may be overcome by recirculating the gas after VOC's are removed. In addition, the in-situ vapor stripping method can be applied when removing dissolved VOC's, or when the organic liquid occurred in a separate phase as a floating substance or a submerged one.

Usually a contaminated aquifer is much larger than the influence zone of a single well. For practical purposes, several wells may be needed. The optimum design of the well field and its optimal operation conditions have to be determined separately for any remediation site according to its characteristics. The relevant parameters for such a design will be the aquifer characteristics (thicknesses of the saturated and unsaturated zones, the regional flow regime, and horizontal and vertical permeabilities), the remediation requirements (final permitted VOC concentrations, and required time frame for cleanup), and the well characteristics (screened interval, and rate of air injection).

Although embodiments of the invention have been described in detail, the invention is not to be limited to such embodiments, but rather by the appended claims.

What is claimed is:

1. A system for removing volatile organic compounds (VOCs) from groundwater, comprising:
    means for injecting a gas into a well, the well extending through a vadose zone into a saturated zone, to force groundwater flow towards and up the well, and to cause VOCs to be transferred from the groundwater to rising gas bubbles inside the well;
    at the top of the well, means for collecting VOC vapor contained within the gas bubbles; and
    means for directing groundwater flow from the well into the vadose zone to infiltrate groundwater therethough for the release of VOCs.

2. The system of claim 1 wherein said collecting means includes:
    a separation means for separating the gas bubbles from the groundwater; and vapor extraction means for removing the VOC vapor.

3. An in-situ system for removing volatile organic compounds (VOCs) from groundwater, comprising:
    means for injecting gas into a well to cause groundwater to flow towards and up the well, and to cause VOCs to be transferred from the groundwater to rising gas bubbles in the well;
    means at the top of the well for separating the gas bubbles including VOC vapor from the groundwater rising in the well;
    extraction means at the top of the well for collecting the VOC vapor after separation from the groundwater; and
    drainage means for infiltrating the groundwater from the top of the well into a vadose zone.

4. The system of claim 3 further including a well screen along a portion of the well for allowing groundwater flow into the well.

5. The system of claim 4 wherein a well screen extends along the portion of the well in the vadose zone.

6. The system of claims 3 or 5 further including means for extracting VOCs from the vadose zone.

7. The system of claim 3 wherein said extraction means includes:
a vapor extraction line extending from a location above said separating means; and
means connected across said vapor extraction line for drawing VOC vapor from the top of the well.

8. The system of claim 7 further including means for treating or destroying the VOC vapor.

9. The system of claim 3 or 7 wherein said gas injection means includes:
a gas line extending into the well; and
a compressor means for injecting gas into said well via said gas line.

10. The system of claim 3 wherein said drainage means includes a plurality of pipes emanating from said separating means.

11. The system of claim 10 wherein said pipes feed into a manifold for forming an infiltration gallery.

12. The system of claim 3 further including means for preventing the injected gas from entering a saturated zone.

13. The system of claim 12 wherein said preventing means includes an eductor conduit extending into the well from the said separation means to the saturated zone so that an annular space is formed between said eductor conduit and the wall of the well.

14. The system of claim 13 wherein said eductor conduit includes slot and baffle means extending from the end thereof into the saturated zone to prevent the injected gas from entering said annular space.

15. The system of claim 13 wherein said eductor conduit directs groundwater and gas bubbles to the separation means.

16. The system of claim 13 further including a well screen means along a portion of the well in the vadose zone and the saturated zone.

17. The system of claim 16 further including means for venting VOC vapor from the vadose zone through said well screen means.

18. A method for removing volatile organic compounds (VOCs) from groundwater, comprising:
injecting a gas into a well extending into a saturated zone to force groundwater flow towards and up the well, and to cause VOCs to be transferred from the groundwater to rising gas bubbles inside the well;
near the top of the well, collecting VOC vapor contained within the gas bubbles; and
directing groundwater flow in the well into a vadose zone to return the groundwater thereto.

19. A method of removing volatile organic compounds (VOCs) from groundwater, comprising:
(a) injecting gas into a well to cause groundwater to flow towards the well and to cause VOCs to be transferred from the groundwater to rising gas bubbles in the well;
(b) near the top of the well, separating the gas bubbles including VOC vapor from the groundwater rising in the well;
(c) after separation from the groundwater, collecting and extracting from the well VOC vapor; and
(d) directing the groundwater rising in the well into a vadose zone.

20. The method of claim 19 further including repeating steps (a)-(d) to establish circulating cycles to reduce the concentration of VOCs in the groundwater.

21. The method of claim 19 further including venting VOC vapor from the vadose zone.

22. The method of claim 19 or 20 further including preventing the injected gas from entering a saturated zone.

23. A method of removing volatile organic compounds (VOCs) from groundwater, comprising:
(a) injecting gas into a well to cause groundwater to flow towards the well and to cause VOCs to be transferred from the groundwater to rising gas bubbles in the well;
(b) near the top of the well, separating the gas bubbles including VOC vapor from the groundwater rising in the well;
(c) after separation from the groundwater, collecting the VOC vapor;
(d) treating or destroying the VOC vapor; and (e) after said collecting, directing the groundwater into a vadose zone.

* * * * *

UNITED STATES PATENT AND TRADEMARK OFFICE
CERTIFICATE OF CORRECTION

PATENT NO. : 5,180,503
DATED : January 19, 1993
INVENTOR(S) : Steven M. Gorelick and Haim Gvirtzman It is certified that error appears in the above-indentified patent and that said Letters Patent is hereby corrected as shown below:

In the drawings, Sheet 1, FIG. 1, the word "CASTING" should read --CASING--, the reference numeral "10" should read --WATER--, and the reference numeral 10 should be applied to the well. In Sheet 2, FIG. 2, on the lower left of the drawing "WATER 10" should read --WATER--, on the lower right of the drawing "10" should read --WATER--, and the reference numeral 10 should be applied to the well. In Sheet 3, FIG. 3, reference numeral "50" should be changed to --30--.

In column 6, line 53, "coalescent" should read --coalescence--. In column 10, lines 1 to 3 (equation 7a), the portion of the equation reading $$\frac{d_b^3}{v^2} \text{ should read } \frac{d_b^3}{v^2} g.$$

In column 10, line 10, before "and" insert --g is the gravitational acceleration (m/sec$^2$),--.

Signed and Sealed this

Twelfth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

Page 1 of 2

PATENT NO. : 5,180,503
DATED : January 19, 1993
INVENTOR(S) : Steven M. Gorelick, et. al.

It is certified that error appears in the above-indentified patent and that said Letters Patent is hereby corrected as shown below:

In column 10, lines 1 to 3 (equation 7a), the portion of the equation reading $$"\frac{d_b^3 \rho_w (\rho_w - \rho_a)}{\mu_w^2}" \quad \text{should read} \quad -- \frac{d_b^3 \rho_w (\rho_w - \rho_a) g}{\mu_w^2} --$$

In column 10, line 40, Table 1:

in the row labeled "Sherwood number," replace the numbers "1000", "1000", and "3700" with --2209--, --2209-- and --7928--, respectively.

in the row labeled "Mass transfer coefficient", replace all three occurrences of the number "1.5 x $10^{-4}$" with --3.27 x $10^{-4}$--.

in the row labeled "Fractional saturation (3m well)", replace "0.79" and "0.40" with --0.967-- and --0.67--, respectively.

in the row labeled "Fractional saturation (6m well)", replace "0.96" and "0.64" with --0.999-- and --0.89--, respectively.

UNITED STATES PATENT AND TRADEMARK OFFICE
CERTIFICATE OF CORRECTION

PATENT NO. : 5,180,503
DATED : January 19, 1993
INVENTOR(S) : Steven M. Gorelick, et. al.

It is certified that error appears in the above-indentified patent and that said Letters Patent is hereby corrected as shown below:

in the row labeled "Fractional saturation (9m well)", replace "0.99" and "0.78" with --1.000- and --0.96--, respectively.

Signed and Sealed this

Twenty-eight Day of March, 1995

Attest:

BRUCE LEHMAN

*Attesting Officer*        *Commissioner of Patents and Trademarks*